INVENTOR
HEINZ LIST

United States Patent Office 3,313,341
Patented Apr. 11, 1967

3,313,341
HEAT EXCHANGER
Heinz List, Pratteln, Switzerland, assignor to
Buss AG, Basel, Switzerland
Filed Feb. 15, 1965, Ser. No. 432,636
Claims priority, application Switzerland, Feb. 22, 1964,
2,245/64
3 Claims. (Cl. 165—92)

The present invention concerns a heat exchanger, for use particularly though not exclusively in the evaporation, crystallisation and drying of products in powder or paste form.

It is known or has been proposed to use bladed driers for the removal of moisture from pastes to produce a powder. Bladed driers enabled drying to be carried out under vacuum or under pressure whereby the products of necessity pass through a viscous paste to condition before the powder is produced. By virtue of the production of the viscous paste the material being dried tended to form a crust on the blades of the drier and as a result of this the rate of heat exchange decreased thus resulting in a lengthening of the drying time. It was often found necessary to include beaters in the drier to clean the surfaces of the blades.

One of the objects of the present invention is to provide a heat exchanger in which the area of the heat transmitting surface of the drier is increased in relation to known driers and to prevent crusting of the material being dried as much as possible. A further object of the invention is to keep the material being dried continuously in motion so as to increase the rate of transference of heat and thus reduce the processing time. According to the present invention a heat exchanger is characterised in that there is provided a housing within which is located a rotatable shaft upon which are located spaced apart discs or groups of discs the said discs co-operating with stirring members located within and secured to the housing.

Preferably the discs or groups of discs are adapted for oscillatory movement within the housing. According to a preferred form of heat exchanger each disc consists of a number of sector shaped members arranged around the shaft, the said sectors comprising the disc being located in a plane at right angles to the axis of the shaft.

An advantage of the use of the true discs or discs made up of sectors as opposed to blades lies in the fact that the heat transferring surface of the heat exchanger is considerably increased. An advantage of the use of stirring members within the housing lies in the fact that automatic cleaning of the heat transferring surfaces and thorough stirring and working of the product to be dried is possible thus enabling drying time to be reduced.

Figure 1:
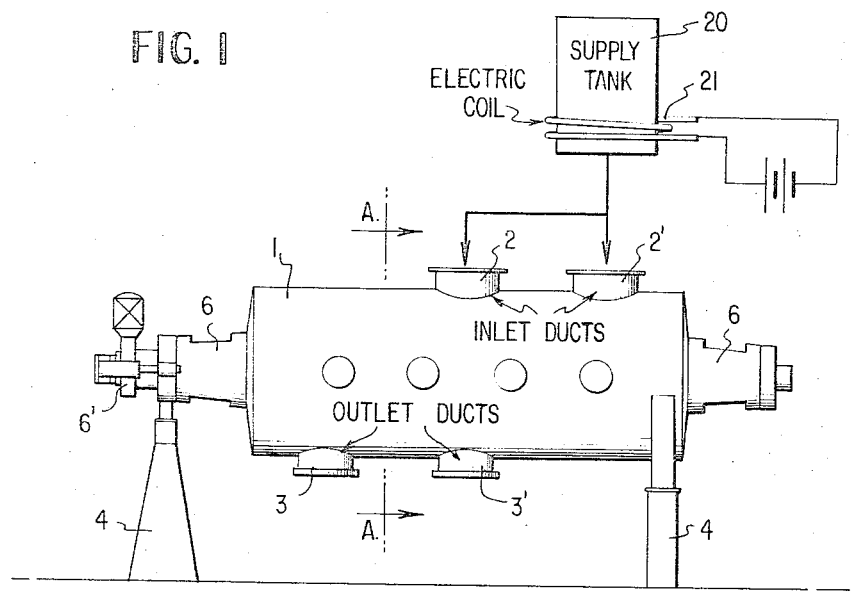
Figure 2:
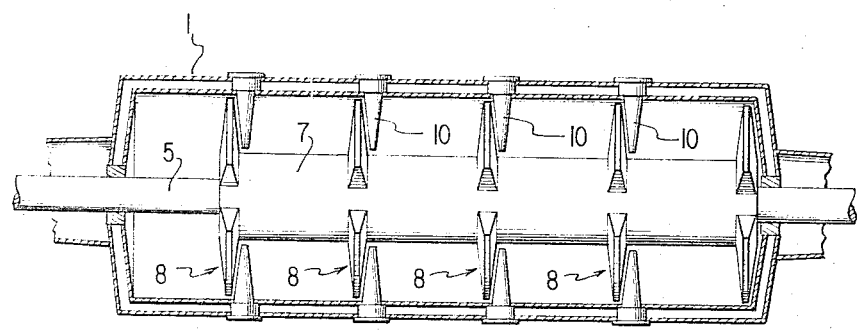
Figure 3:
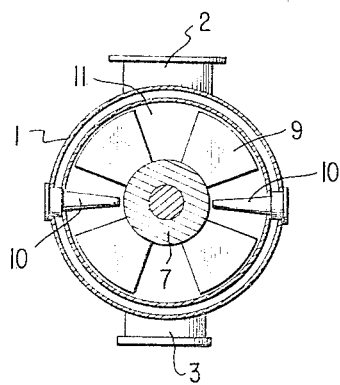

The invention will be described further, by way of example, with reference to the accompanying drawings in which FIG. 1 is a schematic side elevation of a heat exchanger made in accordance with the invention, FIG. 2 is a longitudinal section of the heat exchanger of FIG. 1, and FIG. 3 is a section on the line A—A of FIG. 1. A heat exchanger made in accordance with the invention includes a cylindrical housing 1 provided with an inlet duct 2 for the supply of the product to be treated and an outlet duct 3 removal of the dried product following the evaporation, crystallizing and drying operation carried out within the housing. The housing 1 is constructed of double walls to form an enclosed interior space between inner and outer walls adapted for circulating a heating or a cooling fluid and this interior heating space is provided with steam or hot water from a heating fluid supply tank 20 as diagrammatically shown in FIG. 1, the heating fluid tank being heated by the electric heating means 21, as diagrammatically shown in FIG. 1. A shaft 5 is mounted in bearings 6 for rotary and axial movement within the housing 1, which latter rests on supports 4. A suitable designed gear 6' serves to drive the shaft 5. A portion of the shaft 5 is tubular and provides a stirrer 7 which is internally heated by the heated fluid from the supply tank 20. The stirrer 7 is provided on its periphery with axially spaced groups of discs 8. Each disc 8 is composed of a number of sector shaped members 9 (see FIG. 3) which are located in a plane at right angles to the axis of rotation of the shaft 5. The housing 1 is provided with radially inwardly directed stirring members 10. If desired the members 10 may be heated. The sectors 9 forming the discs 8 co-operate with the stirring members 10 in such a manner that automatic cleaning of the surfaces of the sectors 9 takes place. The sectors 9 of the discs 8 may be heated by steam, hot-water or electricity. In a modified form of disc 8 there may be provided a true disc having apertures therein to replace the discs formed from sectors.

The stirrer 7 simultaneously rotates and oscillates the spaces 11 between the sectors 9 of the discs 8 serve to maintain equalisation of level of the material being dried. The oscillating movement takes place at a rate dependent upon the type of material being dried. In a simplified embodiment the stirrer 7 may be arranged to rotate only. In this arrangement the stirring members 10 are disposed on both sides of the discs 8. It is possible to construct a heat exchanger for continuous operation. In this type of heat exchanger the material to be dried is fed in at one end of the housing 1, for example at neck 2', and removed at the other end of the housing 1 from the neck 3'.

In operation, the material is thoroughly beaten and kneaded in the heat exchanger and the surfaces of the discs are continuously subjected to a cleaning action by the stirring membres 10 to prevent the formation of a crust of dried material thereon. Continuous agitation of the material being dried increases the rate of transference of heat. The arrangement is such that the stirring members 10 can easily be removed from the housing 1 so that when necessary rapid cleaning of the heat exchanger is possible.

When drying materials which are very susceptible to crusting are used it is advisable to provide the stirring members 10 on the surfaces adjacent the discs, with knife edges to ensure thorough cleaning of the surfaces of the discs.

What I claim is:
1. A heat exchanger for the evaporation, crystallisation and drying of products in powder and in paste form, said heat exchanger comprising a horizontal mounted double walled cylindrical housing, the double walls of said housing defining an interior space which is fed with a heated fluid adapted to maintain the contents being dried within said housing at a uniform temperature, an inlet duct at the upper surface of said housing for supply of product into said housing, an outlet duct at the bottom of said housing to discharge the product after drying, a rotatable tubular internally heated shaft lying along the longitudinal axis within said housing; longitudinally spaced apart discs each comprising heated sector-shaped members which are located in a plane at right angles to the axis of rotation of said shaft; stirring members corresponding in location to said discs which project radially inwardly from and are secured to the interior wall of said housing, said tubular shaft, discs and sectors creat- ing a rotating and oscillating movement of concentrated product entrapped between the surfaces of the discs and the surfaces of the sectors, whereby the sector-shape of said members and the shape of said discs causes a continuous self-cleaning action of these members during continuous agitation of the material being dried under the influence of internal and external heat 2. A heat exchanger according to claim 1 in which said stirring members are disposed on each side of said discs.

3. A heat exchanger according to claim 1 in which said stirring members are provided with knife edges on their faces adjacent the discs.

References Cited by the Examiner
UNITED STATES PATENTS

| | | | |
|---|---|---|---|
| 464,166 | 12/1891 | Venuleth | 165—92 X |
| 1,868,512 | 7/1932 | Ahlmann | 165—92 X |
| 2,050,654 | 8/1936 | Gerstenberg | 165—120 X |
| 3,020,025 | 2/1962 | O'Mara | 165—87 |
| 3,022,046 | 2/1962 | Breig | 165—90 |
| 3,206,287 | 9/1965 | Crawford | 165—94 X |

ROBERT A. O'LEARY, *Primary Examiner.*

T. W. STREULE, JR., *Assistant Examiner.*